Patented Nov. 29, 1949

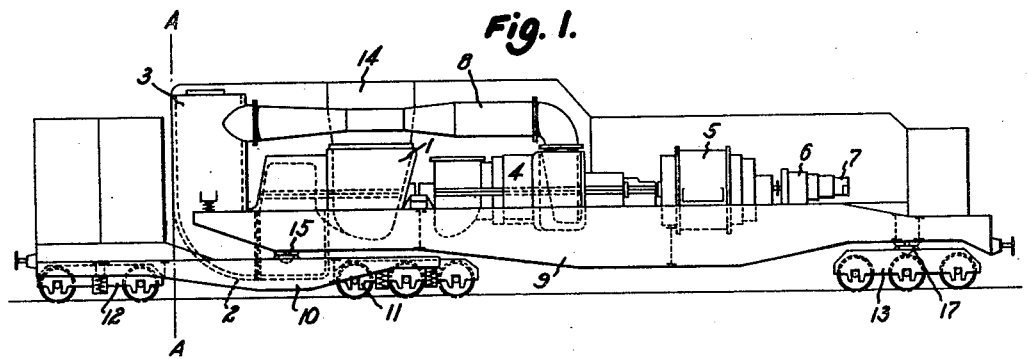
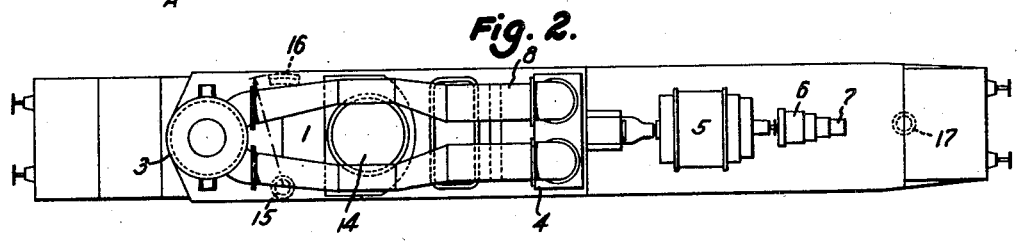
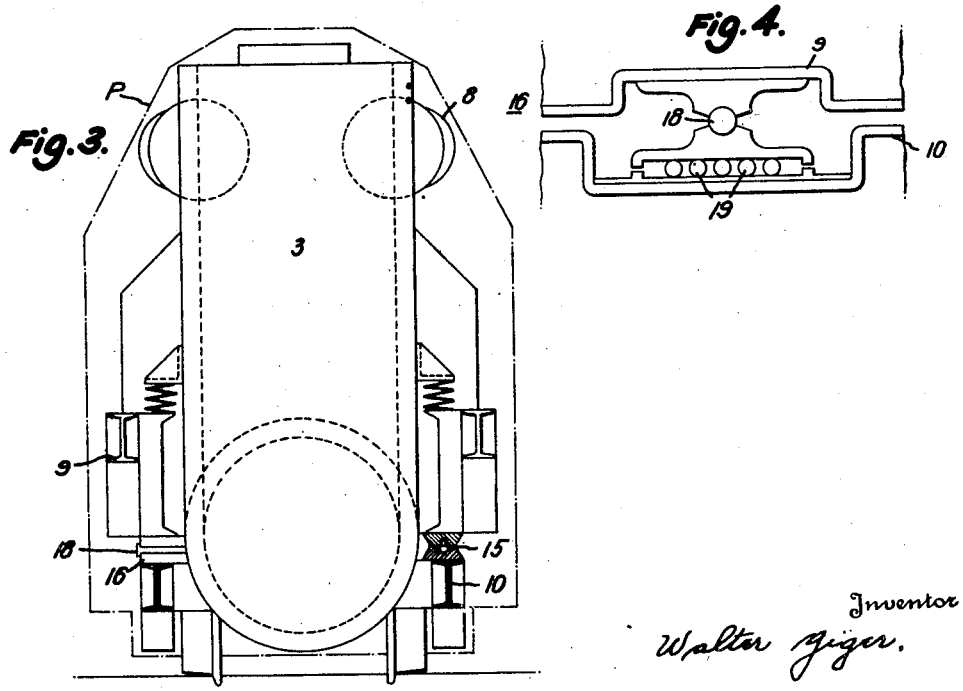

2,489,634

UNITED STATES PATENT OFFICE 2,489,634

BOGIE ARRANGEMENT FOR RAIL VEHICLES

Walter Giger, Zurich, Switzerland, assignor to Aktiengesellschaft Brown, Boveri & Cie, Baden, Switzerland Application June 11, 1945, Serial No. 598,748
In Switzerland June 21, 1944

8 Claims. (Cl. 105—199)

Rail vehicles which are used for special purposes, for instance as mobile power and substations, and have to travel over railway networks, are subject to quite different conditions than the vehicles intended for use between various stations. Such vehicles are also restricted to travelling on the rails of the network but then remain for weeks, months, or even years on the siding belonging to the place to which they have to supply power. Since they are naturally located preferably on unused and therefore poorly maintained sidings the bogies of such vehicles must be very mobile and not only be capable of running over curves with small radius but also over rough tracks. Furthermore the complete outfit must remain within the prescribed loading gauge so that the plant can be universally employed and shifted from one point of the network to the other without difficulty.

Especially for large towns and highly industrialized districts it is an advantage if such a plant is equipped for as large a power as possible, and this necessitates maximum utilization of the available space. This, however, makes it unavoidable that sometimes a concentration of weight occurs at some points of the vehicle and the clearance diagram is fully filled out by some part of the plant, unless other disadvantages are taken into account. In order that the prescribed axle load is not exceeded, the number and distribution of the axles must be arranged to suit such concentrations of weight, and this often results in the axles being arranged together in several groups which are located in bogies suitable for running through the curves of the track. With an uneven track there is not sufficient safety if the main frame is directly supported on more than two bogies. It is therefore necessary to employ a sub-frame on which the main frame of the vehicle rests by means of pivot bearings and guide bearings. On account of the unevenness of the track, provision must also be made for the swinging movement of the intermediate frame about a horizontal transverse axis. All these conditions cannot, however, be fulfilled with the designs used hitherto. It can for instance happen that there is no room for the pivot bearing of the sub-frame in the longitudinal central plane of the vehicle, because the corresponding parts of the plant project too far down into the loading gauge at that particular point of the vehicle. If the pivot bearing were located more towards the front of the vehicle the space between the pivot bearings would be too great and this would result in an excessive lateral extension of the vehicle in the curves and necessitate very heavy longitudinal supports.

According to the invention with such special vehicles the pivot bearing located between the main and sub-frame is therefore displaced to one side of the vehicle whilst the other side is provided with a sector-shaped sliding path which has a radius equal to the distance from the centre of the pivot bearing.

A constructional example of the invention is illustrated in the accompanying drawing where a mobile gas turbine power plant with an output of the order of 6000 k. v. a. is shown in lateral elevation in Fig. 1, and in plan in Fig. 2, whilst Fig. 3 shows a section along the line A—A of Fig. 1. Fig. 4 shows a constructional form of the plain bearing in lateral elevation. Fig. 5 illustrates a modified form of the invention. Since it has been found that horizontal combustion chambers are not so practical as vertical ones for such plants the combustion chamber 3 and its conduit 2 for connecting it to the gas turbine 1 have to occupy the full height of the loading gauge P. On the other hand the great weight of the gas turbine 1, together with the compressor 4 and the electrical machinery 5, 6, 7 require a support which is as close as possible to this machine set in order to be able to keep the longitudinal girder 9 within an admissible height. The total weight has to be distributed as uniformly as possible over eight axles and due to the arrangement of the machinery and the curves which have to be run through there will be three bogies 11, 12 and 13 the first two of which carry the sub-frame 10 which is unsymmetrical as regards the longitudinal direction. Whilst there is room for the pivot bearing 17 of bogie 13 in the longitudinal plane of the vehicle, the corresponding location on the sub-frame 10 is occupied by the low-hanging combustion chamber 3 and the conduit 2. The weight of the main frame 9 and the weight of the entire machinery and apparatus of the plant mounted thereon must therefore be carried at both sides of the sub-frame 10 of the vehicle, one side of the frame 9 being supported on sub-frame 10 by the pivot bearing 15 and the other side resting on an arcuate bearing path or support 16. Supporting points 15 and 16 lie in this case in the planes of the longitudinal girders of the sub-frame 10; they can, however, as shown in Fig. 5 be located further outwards, for instance in the planes of the longitudinal girders of the main frame 9. Main frame 9 is thus supported at three points whose connecting lines form an equilateral triangle; such an arrangement is known to give the best conditions for stability.

The construction described above results in all the tensile and compressive stresses being transmitted by the sub-frame 10 to one of the two longitudinal girders of the main frame 9 when the vehicle is pushed or pulled around a curve. Since, however, the vehicle is seldom moved from one site to another and then only at a low speed of not more than 20-25 km./h., such a one-sided stress is admissible because both longitudinal girders of frame 9 are connected together by strong transverse supports and diagonal beams. Similar forces also occur in normal railway service, particularly in shunting service, for instance when with a double-buffer type of locomotive the train is pushed along a curve, because then the entire impact force passes only over the inside buffer; when there are S curves the impact force changes over from one buffer to the other.

In order to provide for poor track conditions both pivot bearings 15 and 17 are preferably of the ball-and-socket type, the ball member of each bearing being a ball ended pin carried by girder 9 and seated in the corresponding socket members formed in bogie 13 and sub-frame 10 whilst the arcuate sliding path 16 whose center of curvature lies at the center of pivot bearing 15 contains a joint 18 located at the same level as the centre of the ball member of bearing 15. Such an arrangement is shown in Fig. 4 where the sliding path is armoured with radially located rollers 19, it being understood of course that the rolling axis of each of the rollers 19 is coincident with the radius of curvature of path 16.

Elements which are not directly connected with the invention, such as the fuel tank, oil cooler, pipes, auxiliary machines, switchgear and brakes, are omitted from the drawing. Only the piping connecting the compressor 4 with the combustion chamber 3 is shown; it is divided into two pipes 8 which pass along each side of the exhaust gas conduit 14 of the gas turbine 1.

The construction according to the invention can of course also be applied to vehicles where the machinery is arranged differently, or where different powers are concerned and where other operating conditions and regulations prevail.

I claim:

1. A rail vehicle comprising a main frame constituted in part by longitudinal girders, means supporting said frame at one end, a sub-frame constituted in part by longitudinal girders mounted on spaced bogies, and means supporting the other end of said main frame on said sub-frame, said supporting means comprising a pivot bearing located intermediate the supporting bogies for the sub-frame and to one side of the longitudinal central axis of said frames, and a sector shaped sliding path support including cooperative sliding surfaces located to the other side of said axis, said sliding path support having a center of curvature coincident with the center of said pivot bearing.

2. A rail vehicle as in claim 1, characterised by the feature that the pivot bearing and sliding path lie in the planes of each of the longitudinal girders of one of the frames.

3. A rail vehicle as in claim 1, characterised by the feature that the pivot bearing and sliding path of the sub-frame each lie below a longitudinal girder of the main frame.

4. A rail vehicle as in claim 1, characterised by the feature that pivot bearing and sliding path of the sub-frame each lie above a longitudinal girder of the sub-frame.

5. A rail vehicle as in claim 1, characterised by the feature that the sliding path is equipped with supporting rollers.

6. A rail vehicle as in claim 1, characterised by the feature that the sliding path is equipped with supporting rollers and that the horizontal axes of the rollers are directed radially towards the centre of the pivot bearing.

7. A rail vehicle as in claim 1, characterised by the feature that at least one of the sliding surfaces of the sliding path is connected to the associated frame by means of a joint with horizontal axis.

8. A rail vehicle as in claim 1, characterised by the feature that said pivot bearing is comprised of cooperative ball and socket members, that at least one of the sliding surfaces of the sliding path is connected to the associated frame by means of a joint having a horizontal axis, and that the axis of said joint and the center of the ball member of said bearing lie in the same horizontal plane that the axis of the joint and the centre point of the spherical shaped pin lie in the same horizontal plane.

WALTER GIGER.

No references cited.

Certificate of Correction

Patent No. 2,489,634                              November 29, 1949

WALTER GIGER

It is hereby certified that errors appear in the printed specification of the above numbered patent requiring correction as follows:

Column 2, lines 17 and 18, strike out "Fig. 5 illustrates a modified form of the invention."; lines 50 and 51, strike out "as shown in Fig. 5";

and that the said Letters Patent should be read with these corrections therein that the same may conform to the record of the case in the Patent Office.

Signed and sealed this 25th day of April, A. D. 1950.

[SEAL]

THOMAS F. MURPHY,
*Assistant Commissioner of Patents.*